United States Patent

[11] 3,632,224

[72] Inventors Jack D. Wright
 Mason;
 Werner E. Howald, Cincinnati, both of Ohio
[21] Appl. No. 15,353
[22] Filed Mar. 2, 1970
[45] Patented Jan. 4, 1972
[73] Assignee General Electric Company

[54] ADJUSTABLE-BLADE TURBINE
 1 Claim, 5 Drawing Figs.
[52] U.S. Cl. .................................... 415/149, 415/47
[51] Int. Cl. .................................... F04d 27/00
[50] Field of Search .................................... 60/39.25, 39.16; 415/17, 148, 149, 150, 162, 47

[56] References Cited
 UNITED STATES PATENTS
 2,651,492  9/1953  Feilden .................... 60/39.25
 3,318,574  5/1967  Tyler ....................... 60/39.16
 FOREIGN PATENTS
 884,930   7/1953  Germany ................... 415/149
 247,831   1/1948  Switzerland ................ 415/162

Primary Examiner—Henry F. Raduazo
Attorneys—Derek P. Lawrence, Lee H. Sachs, Frank L. Neuhauser, Oscar B. Waddell, Joseph B. Forman, and Thomas J. Bird Jr.

ABSTRACT: A gas turbine engine is shown in which the turbine nozzle vanes and turbine outlet guide vanes are simultaneously pivotal to obtain greater efficiencies over a broad range of gas stream energy levels.

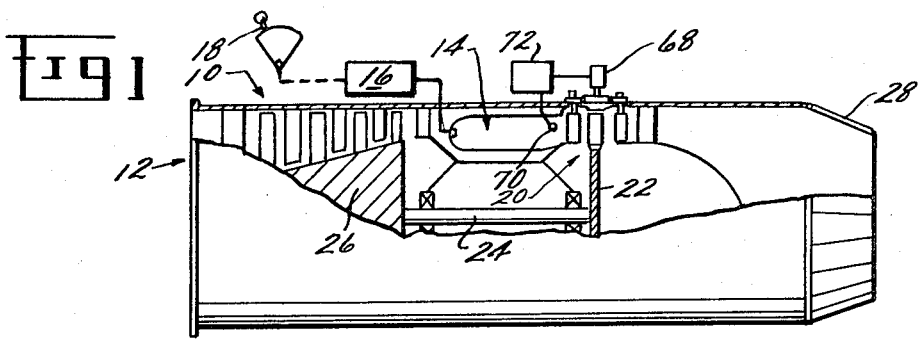
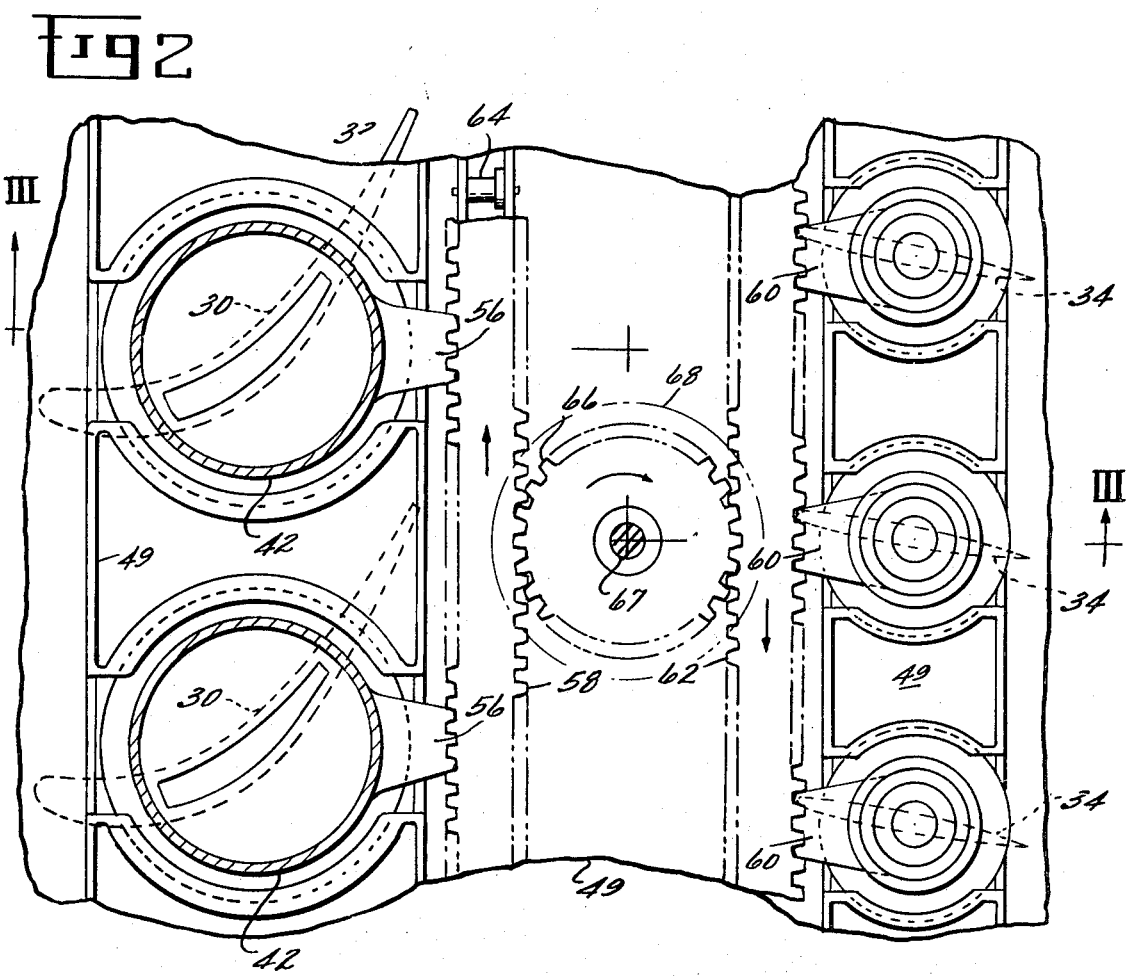
INVENTORS
JACK D. WRIGHT
WERNER E. HOWALD
BY
ATTORNEY

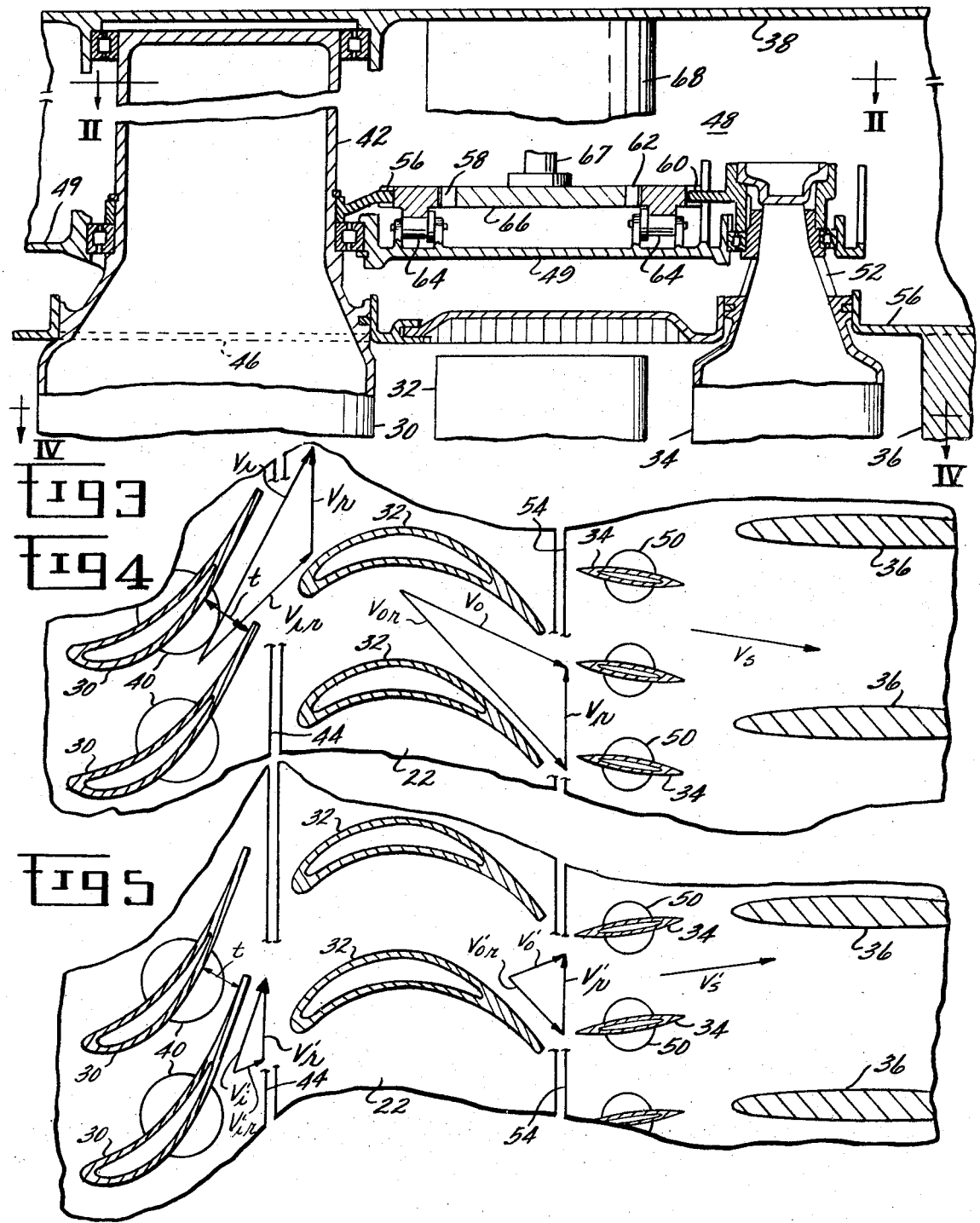

ADJUSTABLE-BLADE TURBINE

The present invention relates to improvements in gas turbine engines and, more particularly, to improved turbine vane adjusting mechanisms.

In gas turbine engines for aircraft propulsion, a high-energy hot gas stream is generated by pressurizing air which supports combustion of fuel in a combustor. A portion of the energy is extracted by a turbine which in turn powers the compressor rotor. The remainder of the energy is converted to a propulsive force by discharging the gas stream from a propulsion nozzle.

Recent improvements have led to engines capable of generating gas streams of extremely high energy levels which provide high-performance capabilities for supersonic flight. However, in many cases, the flight mission requirements of an aircraft require high-performance operation, i.e., supersonic propulsion, during only a portion of its operation and lower performance, e.g., subsonic propulsion, during other substantial portions of its operation. Under these conditions, requiring different power levels, it becomes difficult to obtain overall engine efficiency since optimization for one power setting may, and usually does, give lesser efficiency at a different setting.

One area in which this problem is most apparent is in the turbines of high-performance engines. Such turbines comprise nozzle vanes which accelerate the hot gas stream to drive a bladed turbine rotor. After passing through the rotor blades, the hot gas stream is straightened to an axial direction by outlet guide vanes to obtain a maximum thrust when the hot gas stream is subsequently discharged from a propulsive nozzle.

The velocity vector relationships of the gas stream and the angles and cambers of the blades and vanes can readily be optimized for one operating condition, i.e., power setting, of the engine for a given set of parameters. Operation at other power settings and parameters is less efficient as the vector relationships change. In this connection it should be pointed out that the hot gas stream, for best efficiency, should be at a sonic velocity as it is discharged from the nozzle vanes to the turbine blades. The profile of the vanes can be idealized to form choked throats which produce sonic velocity or Mach No. = 1.0. However, when temperature varies with a different gas stream energy level, sonic velocity also varies so that a given throat area produces sonic velocity for only one gas stream temperature (other parameters remaining constant). Actually, the ideal relationship is somewhat more complicated, and best efficiencies are obtained by maintaining the nozzle flow function ($\phi$) a constant. The flow function ($\phi$) is calculates as:

$$\phi = Wa\sqrt{TR}/PA$$

wherein
- $Wa$ = Mass airflow
- $T$ = Temperature (Rankin)
- $R$ = Universal gas constant
- $P$ = Pressure
- $A$ = Area It has been recognized previously that the flow function for turbine nozzle vanes should be maintained constant and several proposals have been made to accomplish this end. Mostly these proposals have been based on a variable-area concept wherein the nozzle vanes are pivoted about radial axes to vary their nozzle throat areas to obtain a constant flow function for varying gas stream temperatures.

When this is done, there is a wide variation in the velocity of the hot gas stream entering and also leaving the turbine rotor. The rotational speed of the rotor may, but does not always, vary with the entering velocity. In any event, it is impossible, if not impossible, that the velocity changes would result in the absolute exit vector direction of the hot gas stream from the rotor being maintained in a constant direction.

On object of the invention is to obtain greater efficiency of gas turbine engines operating at different energy levels or power settings for substantial portions of their operation.

Another, and more specific, object of the invention is to improve the gas stream velocity vector relationships, both in entering and on discharge from a turbine rotor.

These ends are broadly attained by an axial flow gas turbine having pivotal nozzle vanes upstream of the turbine rotor and pivotal outlet guide vanes downstream of the rotor. These vanes are pivoted, as a function of gas stream temperature, to vary the area of the throat sections formed by the nozzle vanes, preferably to maintain a constant flow function ($\phi$) and to obtain a proper angle of attack of the gas stream discharged toward the outlet guide vanes. Additionally, fixed outlet guide vanes may be provided downstream of the variable outlet guide vanes to minimize the angle through which the gas stream is turned by the variable outlet guide vanes.

The above and other related objects and features of the invention will be apparent from a reading of the following description of the disclosure found in the accompanying drawings and the novelty thereof pointed out in the appended claims.

In the drawings:

FIG. 1 is a simplified drawing of a gas turbine engine embodying the present invention;

FIG. 2 is a section, taken on line II—II in FIG. 3, illustrating turbine vane-adjusting mechanism which is briefly depicted in FIG. 1;

FIG. 3 is a section taken on line III—III in FIG. 2;

FIG. 4 is a development, taken on line IV—Iv in FIG. 2, showing one extreme of vane adjustment with velocity vector relationships superposed thereon; and FIG. 5 is a development, similar to FIG. 4, illustrating the other extreme of vane adjustment.

The gas turbine engine seen in FIG. 1 comprises an axial flow compressor 10 which pressurizes air entering an inlet 12. The pressurized air is discharged from the compressor 10 to a combustor 14 to support combustion of fuel in generating a hot gas stream. The rate of fuel flow is controlled by a fuel control 16 which is usually regulated by a pilot-operated lever 18. Rate of fuel flow is the primary factor in determining the energy level and temperature of the hot gas stream and the resulting power level of the engine.

From the combustor the hot gas stream is discharged to an axial flow turbine 20 which comprises a rotor 22. The turbine rotor 22 is connected by a shaft 24 to the compressor rotor 26 to drive the latter rotor. The rotors 22, 26 and shaft 24 are commonly referenced as the engine rotor.

After passing through the turbine 20, the hot gas stream is discharged from a nozzle 28 to convert its remaining energy to a propulsive force. Although a simple convergent nozzle is shown for sake of illustration, it is to be understood that a convergent-divergent nozzle would be employed for high-performance, supersonic operation.

The turbine 20 (FIGS. 2 and 3) comprises nozzle vanes 30 for directing the hot gas stream toward blades 32 which project from the turbine rotor 22. The hot gas stream passes from these blades to outlet guide vanes 34 and then between fixed guide or straightening vanes 36 which assure an essentially axial flow path for the hot gas stream as it is discharged from the nozzle 28.

The outer bounds of the annular gas flow path through the turbine 20 is defined by a compositely formed casing 38 which comprises appropriately cooled liners and shrouds over which the hot gas stream actually flows. The inner bounds of this annular flow path may be formed by known means including shrouds and platforms at the bases of the blades 32. Known sealing means, usually of the labyrinth-tooth type, are provided between the rotating and nonrotating components.

The nozzle vanes 30 have spindles 40, 42 projecting respectively from their inner and outer ends. These spindles and vanes may be hollow to provide a flow path for vane-cooling air. The inner spindles 40 project into and are journaled on the inner turbine nozzle shroud 44. The outer spindles 42 project through the outer turbine nozzle shroud 46 and are journaled on the casing 38 in an annular chamber 48. The casing 38 comprises an intermediate annular frame 49, within the chamber 48, which supports one of the journals for the spindles 42.

The outlet guide vanes 34 are similarly mounted, having spindles 50, 52 projecting respectively from their inner and outer ends. These spindles and the vanes 34 may also be hollow for cooling purposes. The inner spindles 50 project through and are journaled on an inner shroud 54 and the outer spindles 52 project through and are journaled on an outer shroud 56 which forms a part of the casing 38. The journals for the spindles 52 are also mounted on the frame 49.

Each spindle 42 has a gear segment 56 secured thereto and meshing with a ring gear 58. Each spindle 52 has a gear segment 60 secured thereto and meshing with a ring gear 62. The ring gears 58 and 62 are journaled on rollers 64 carried by the frame 49. The opposed surfaces of the ring gears 58 and 62 have teeth with which pinions 66 (one is shown) mesh. The pinions 66 are secured respectively to the output shafts 67 of rotary actuators 68 which are mounted within the chamber 48. The angular output position of the actuators 68 is controlled as a function of the temperature of the hot gas stream entering the nozzle vanes 30. This is diagrammatically illustrated (FIG. 1) by a device 80 for generating a signal proportional to the nozzle vane inlet temperature and a function generator 72 to which the temperature signal is fed. The output of the function generator 72 controls the angular position of the outlet shafts of the rotary actuators 68 and thus the angular position of the nozzle vanes 30 and outlet guide vanes 34.

FIG. 4 illustrates a typical turbine configuration for full power operation. The cambered nozzle vanes are pivoted to provide a maximum throat opening, $t$. The hot gas stream has velocity vector $V_i$ as it is discharged from the throat $t$. The rotor 22 has a velocity vector $V_r$, and the gas stream has a velocity vector relative to the blades 32 represented by $V_{ir}$. The discharge of the gas stream from the rotor is represented by vector $V_{or}$. Again, the rotor velocity vector $V_r$ is subtracted so that the discharge velocity vector, impinging the outlet guide vanes, is $V_o$. The outlet guide vanes 34 are preferably uncambered and/or symmetrical airfoils which turn the gas stream so that it is discharged therefrom with a vector $V_s$. The fixed straightening vanes 36 need not be as many in number as the outlet guide vanes. Preferably the straightening vanes 36 are axially aligned with and closely spaced downstream from alternate outlet guide vanes 34. Axially adjacent vanes 34 and 36 function as split airfoils to discharge the hot gas stream toward the propulsive nozzle with an essentially axial velocity vector.

The angular position of the nozzle vanes 30 is set to provide the necessary flow function to provide sonic flow of the gas stream discharged therefrom. The angular position of the vanes 34 is set so that angle of attack of the vector does not exceed the stall angle, thus the gas stream may be turned toward an axial direction without any severe losses as would be caused by separated flow. Similarly, the vanes 34 turn the gas stream sufficiently toward an axial direction so that there is no separated flow as the gas stream passes over the uncambered, axially disposed airfoils of the straightening vanes 36.

When fuel flow is reduced for operation of the engine at a minimum power setting, the gas stream temperature and velocity are reduced and such reductions can be quite substantial, as shown by the vector $V_i$ in FIG. 5. Since sonic velocity is reduced, the vanes 30 are pivoted as a function of gas temperature to reduce the throat dimension $t$ to maintain the desired constant flow function. This pivot adjustment is automatically obtained as the temperature signal generator output changes and the actuators 68 rotate to pivot the vanes 30. The other velocity vectors also change, as indicated in FIG. 5, by the primed vectors which correspond to the previously described vectors.

It will be noted that the rotor velocity vector $V_r'$ is not reduced in the same proportion as the gas vector $V_r'$. Thus, there is a substantial angular change in the vector $V_o'$ of the gas stream approaching the outlet guide vanes 34. To compensate for this change in vector angle, the vanes 34 have been pivoted to maintain an acceptable angle of attack as the gas stream is turned toward an axial direction and then straightened to an essentially axial direction by the straightening vanes 36.

The adjusting mechanism, through the function generator 72 and the linkage or gear connection to the vanes 30, positions the latter to provide a constant flow function for sonic discharge of the hot gas stream toward the turbine blades.

The outlet guide vanes are adjusted as a function of the change in angular position. The illustrated mechanism provides a linear relationship between the change in angular position of the vanes 30 and the vanes 34 in the ratio of 2:1 (note ratio between the radii of the sectors 56 and 60). Nonlinear relationships can also be utilized to meet the aerodynamic requirements of a given turbine design as, for example, by the use of elliptical gearing.

The present invention is primarily of benefit where a substantial portion of an engine's operation is to be at two different power settings which have large differences in the gas stream temperature.

Where a greater amount of time is to be at one power rating, the vane adjustments, as well as the vane and blade profiles, would be optimized for the operating parameters of that power rating. Thus, while the outlet guide vanes 34 are shown as uncambered airfoils which are swung equally in opposite directions from an axial direction, they could be cambered and swung through a range entirely on one side or the other of an axial line, dependent on the vector relationships of a given turbine and the mission requirements of the engine.

The above and other modifications of the preferred embodiment described will occur to those skilled in the art within the spirit and scope of the present inventive concepts.

Having thus described the invention, what is claimed as novel and desired to be secured by Letters Patent of the United States is:

1. An axial flow gas turbine comprising,
   a turbine rotor having radially projecting, cambered airfoil blades,
   a plurality of angularly spaced, radially projecting, nozzle vanes defining throat sections from which a hot gas stream is discharged toward said blades to drive said rotor,
   a plurality of angularly spaced, radially projecting, uncambered outlet guide vanes for turning the gas stream discharge from the rotor blades toward an axial direction,
   fixed, uncambered, vanes downstream of said outlet guide vanes for further turning the gas stream to an axial direction, said fixed vanes being generally aligned with selected outlet guide vanes, and
   means for pivoting said nozzle vanes and said outlet guide vanes about their respective axes as a function of gas temperature for maintaining an essentially constant flow function through the nozzle vanes, and to maintain a proper angle of attack by the hot gas stream toward said outlet guide vanes, said pivoting means pivoting the nozzle vanes and the outlet guide vanes in the same direction (either clockwise or counterclockwise) with a fixed ratio of angular movement of the nozzle vanes relative to the outlet guide vanes with the latter moving to a greater angular extent, said outlet guide vanes further having extreme positions of pivotal movement which are equiangular from an axial direction.

* * * * *